Oct. 31, 1961 P. EALET 3,006,489
DEVICE FOR LIFTING AND HANDLING BALES
OF STRAW FODDER OR THE LIKE
Filed March 14, 1960 11 Sheets-Sheet 4

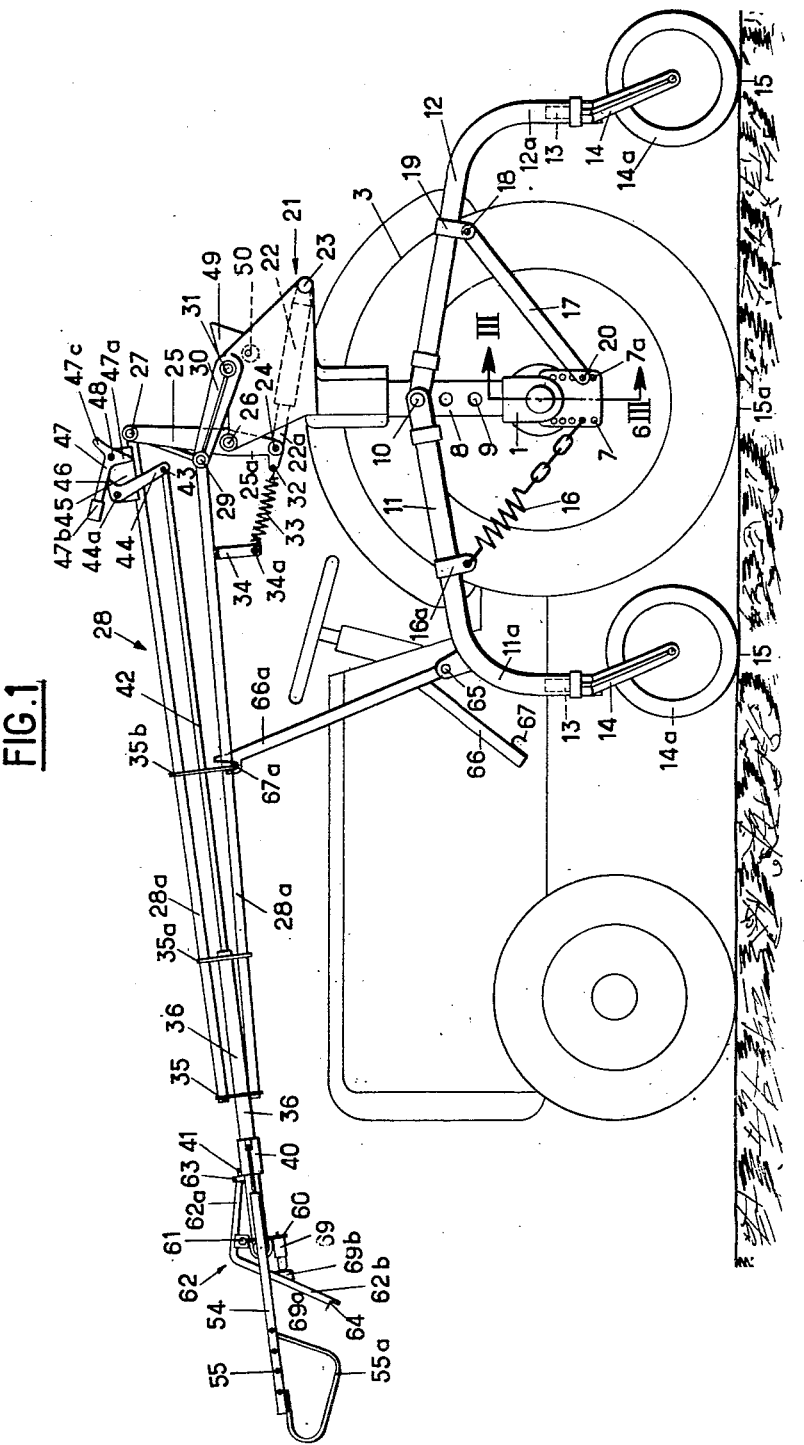

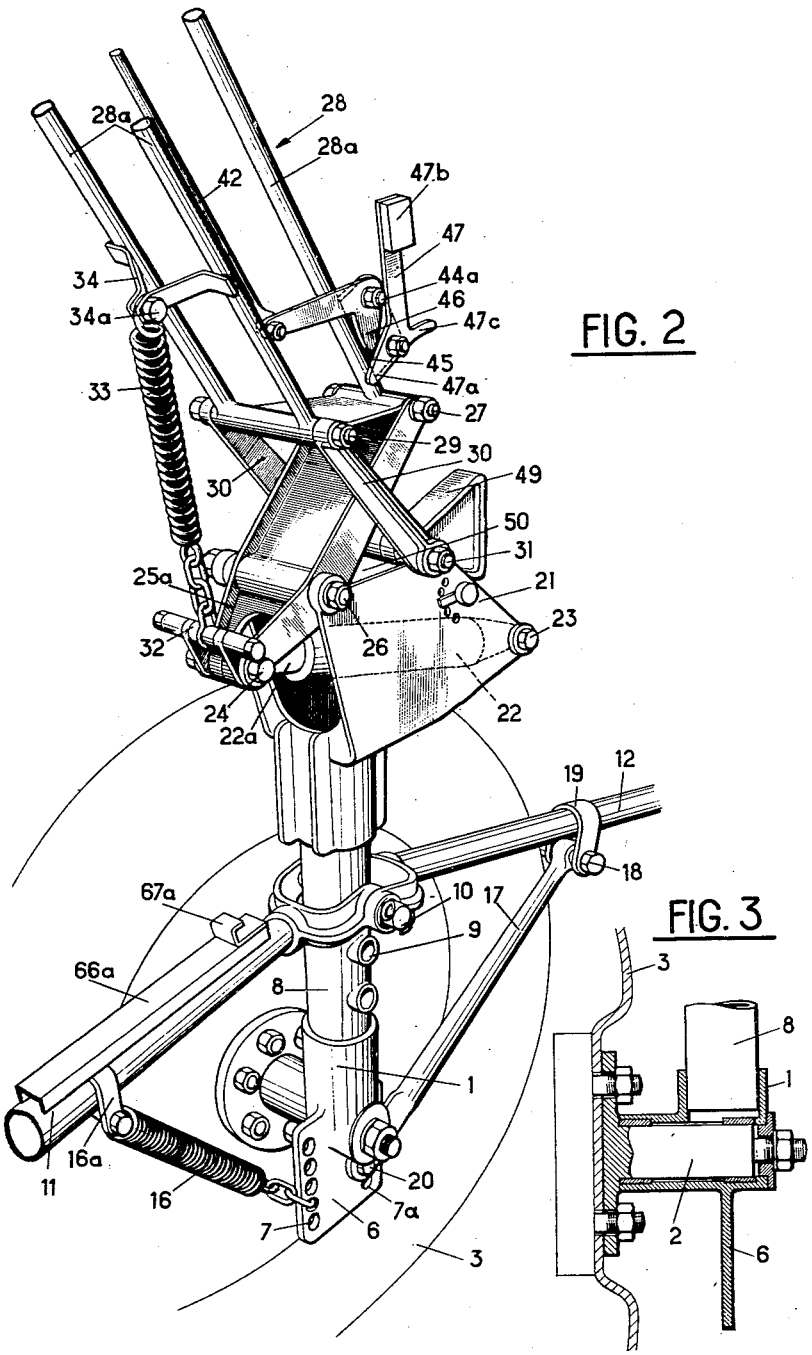

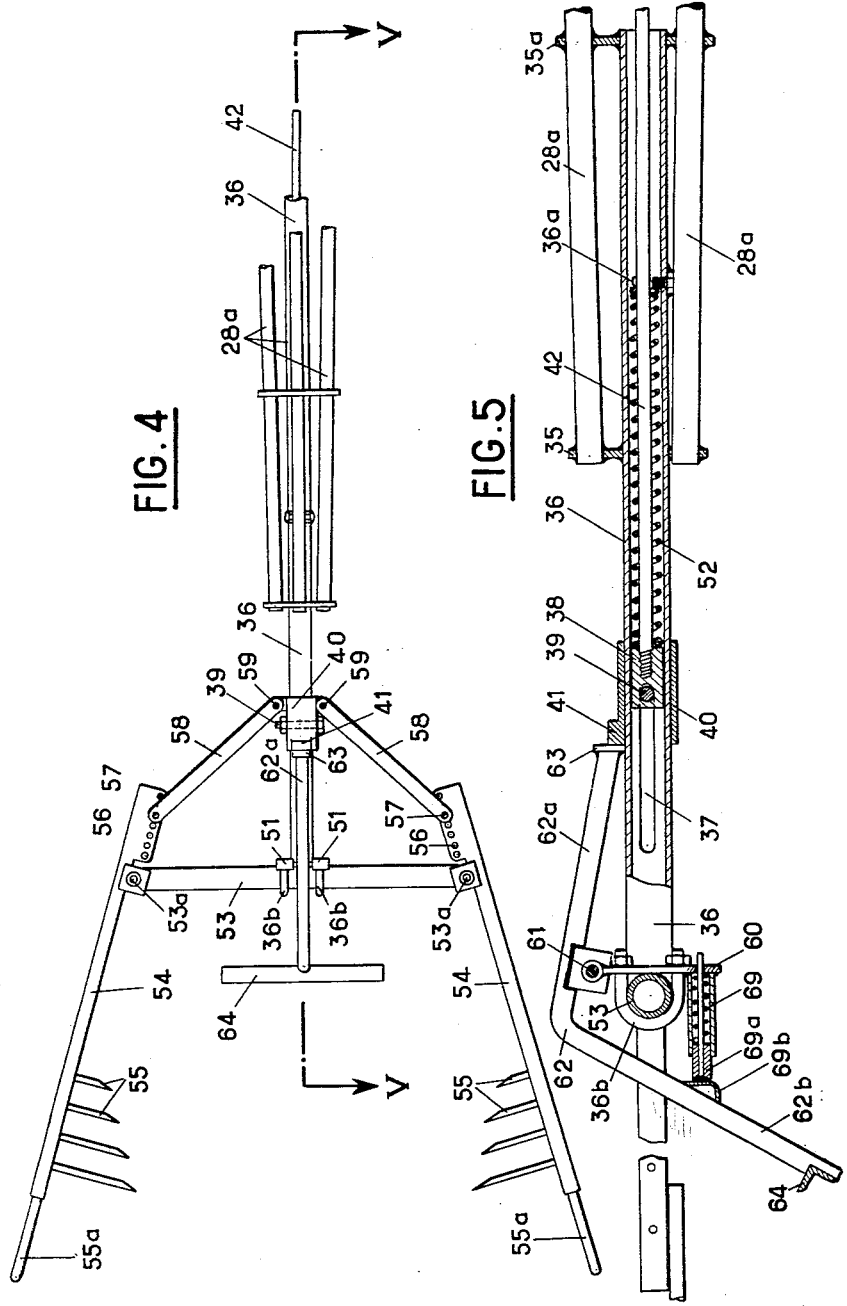

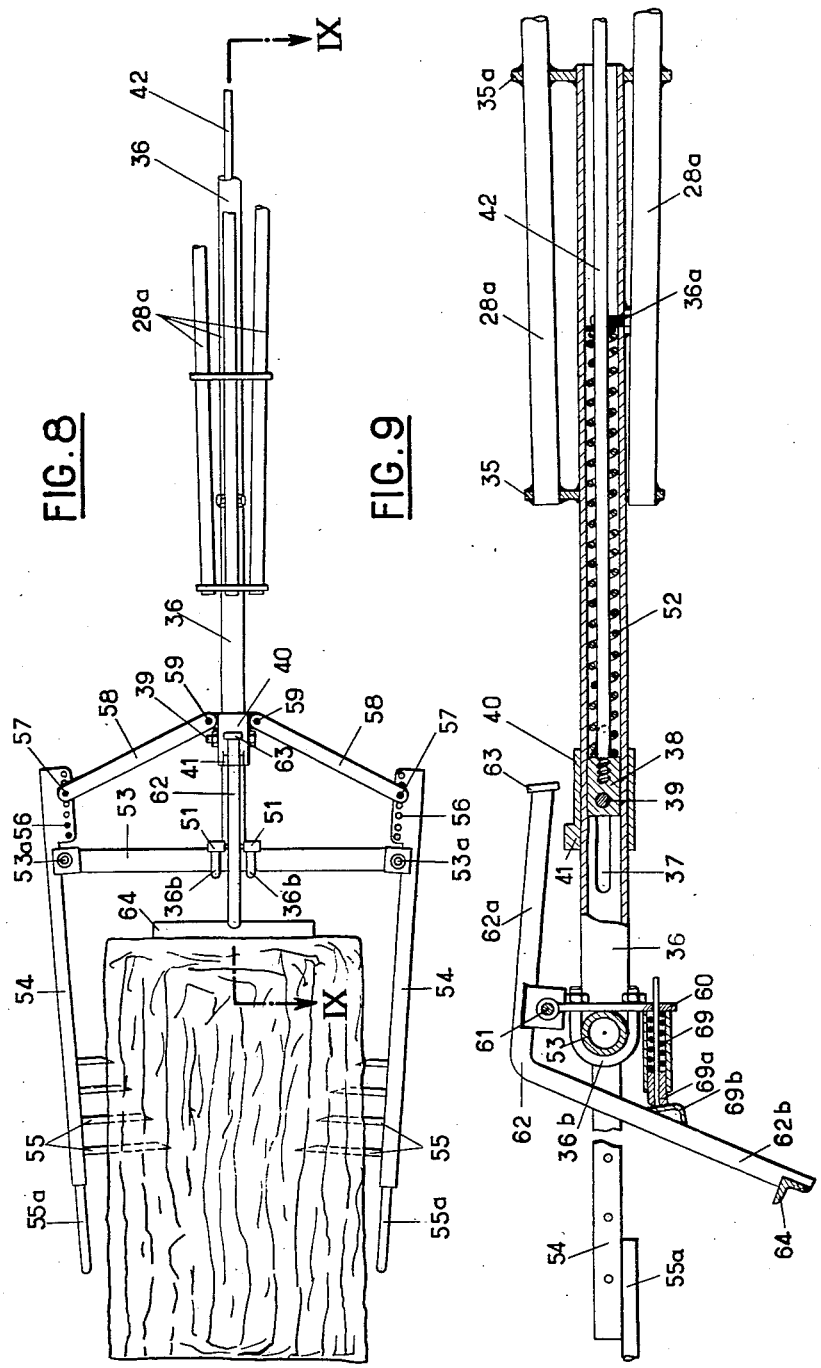

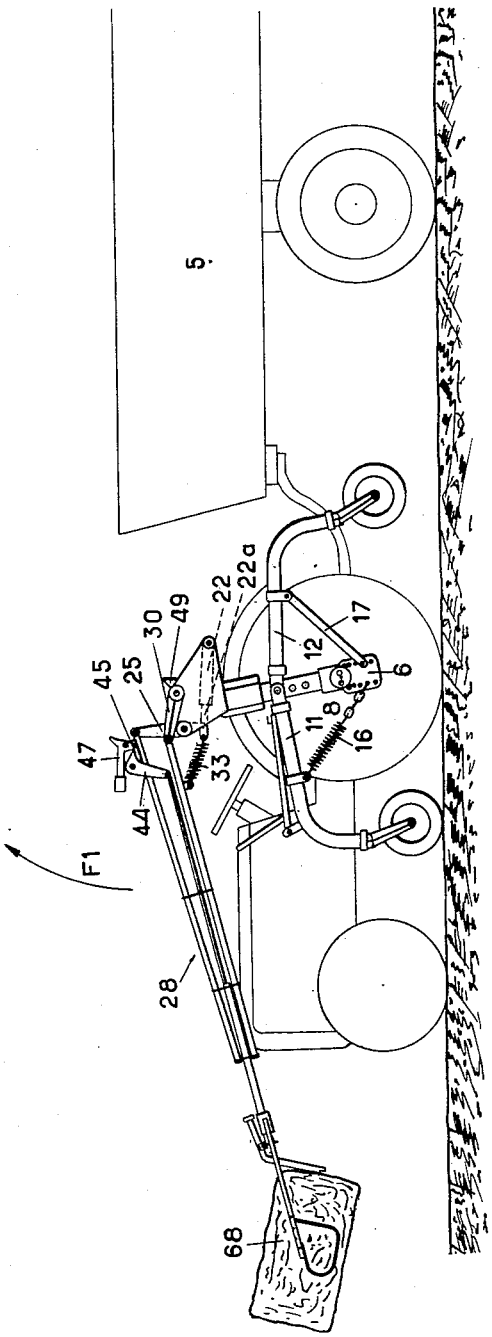

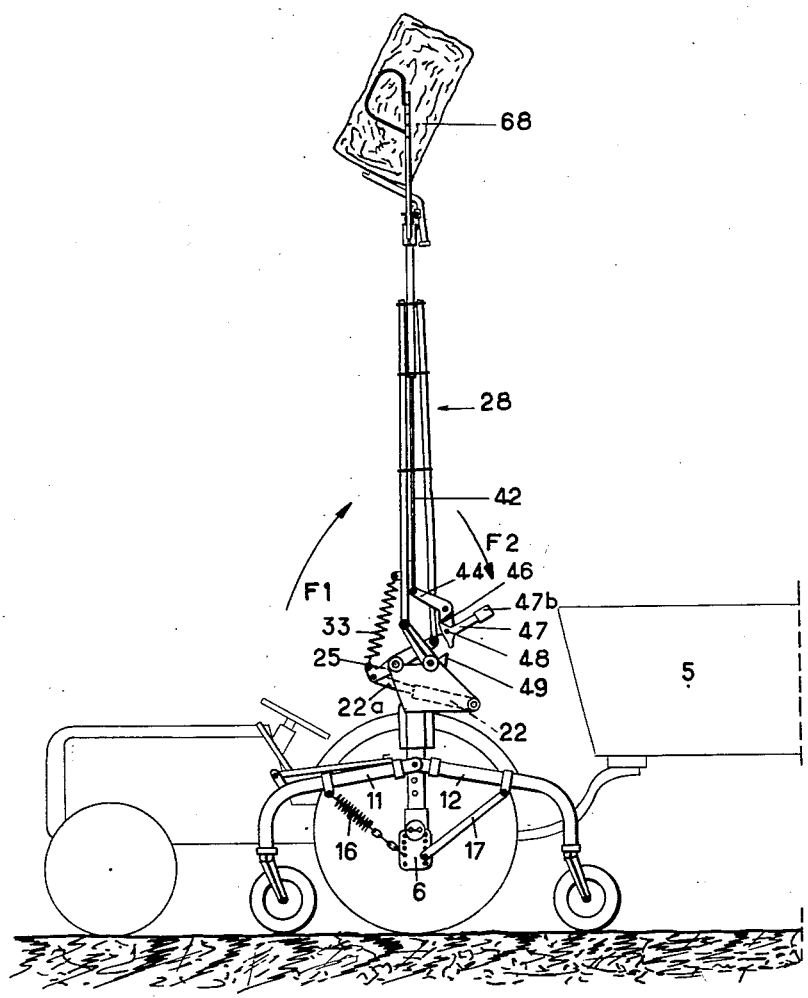

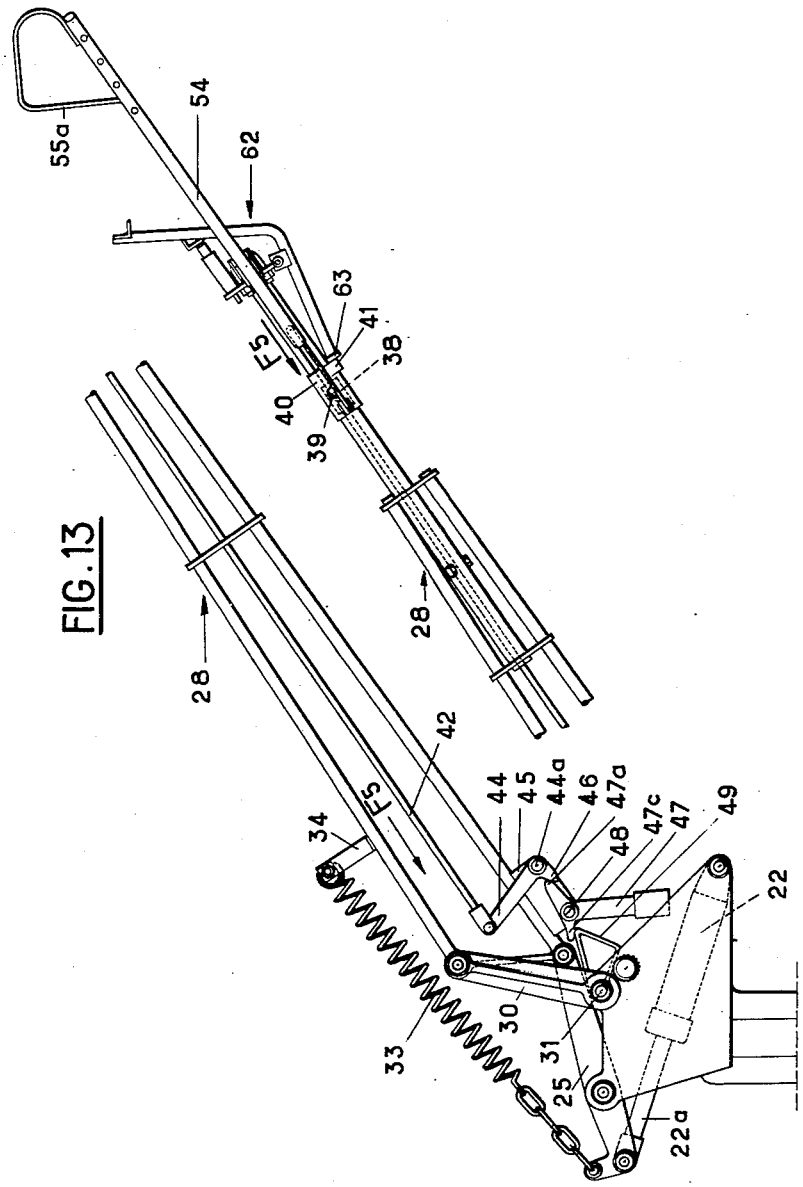

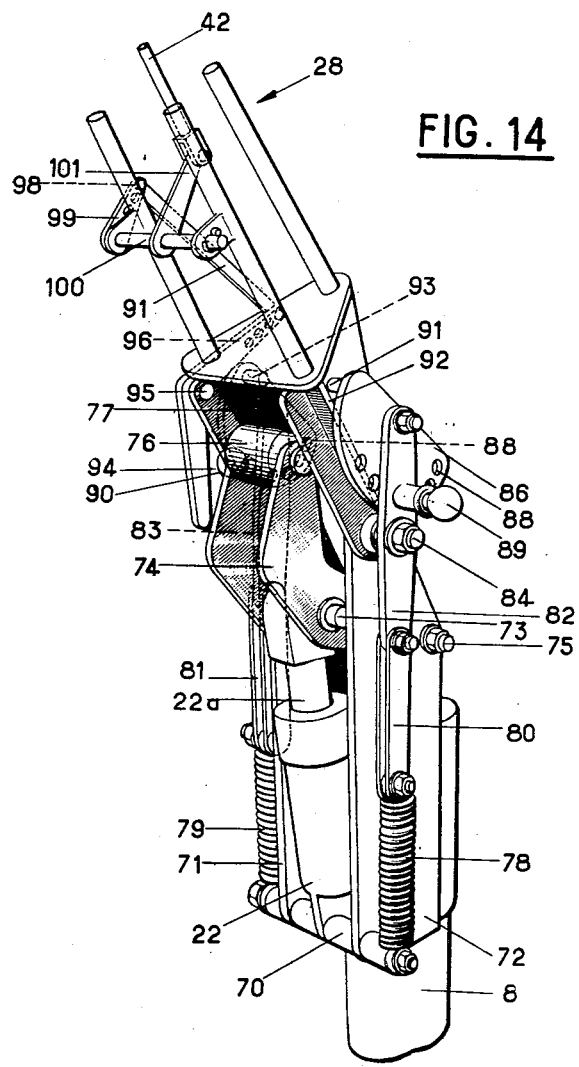

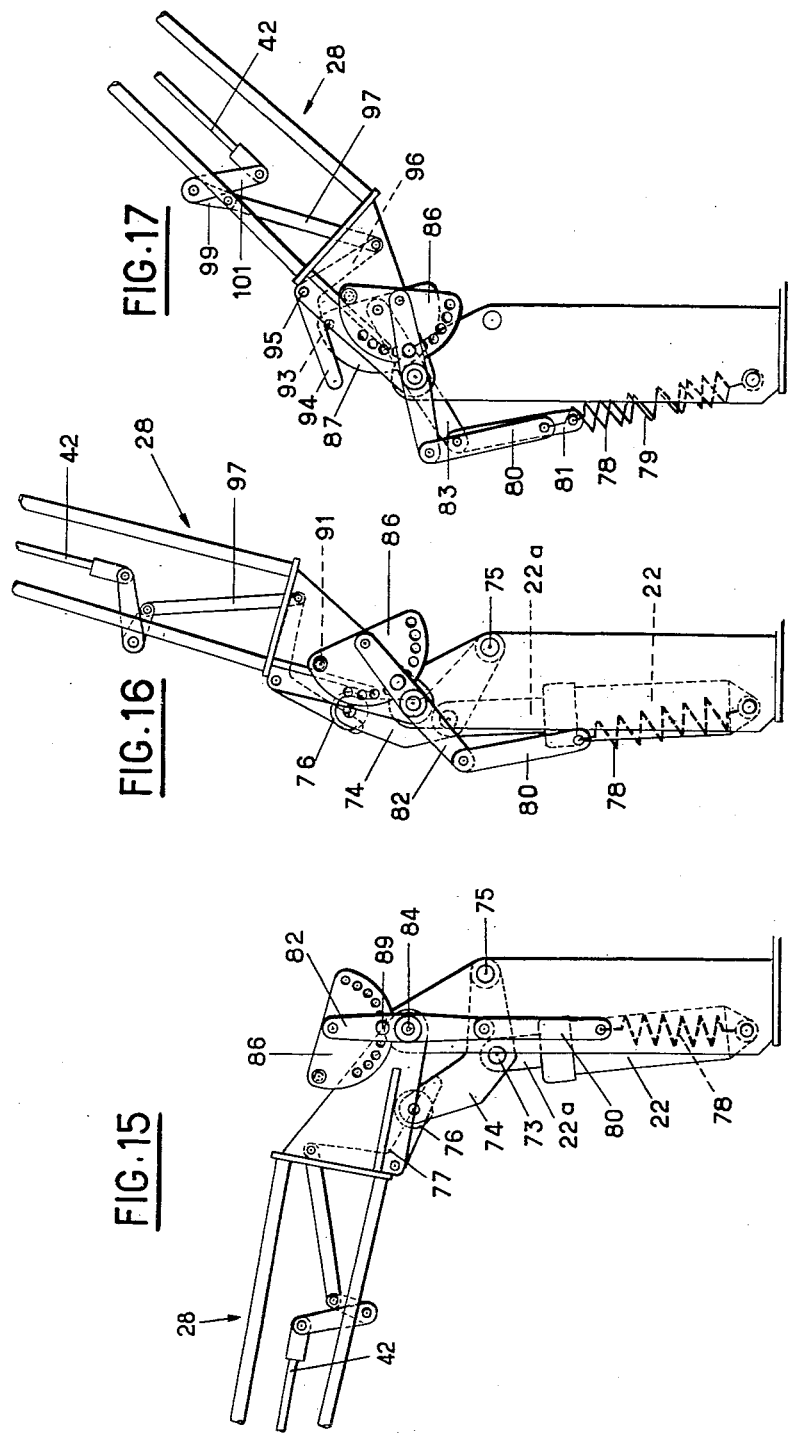

United States Patent Office 3,006,489
Patented Oct. 31, 1961

3,006,489
DEVICE FOR LIFTING AND HANDLING BALES
OF STRAW FODDER OR THE LIKE
Pierre Ealet, Charleville, France, assignor to Societe
Anonyme dite: Etablissements Gustin Fils, Deville,
France, a corporation of France
Filed Mar. 14, 1960, Ser. No. 14,700
Claims priority, application France Mar. 16, 1959
6 Claims. (Cl. 214—147)

This invention relates to a device for lifting and handling loads and is more particularly adapted for lifting and handling bales of straw, fodder or the like.

The device, which obviously can be used for lifting and handling any loads other than those aforesaid, is characterized in that it comprises a suspension and running gear comprising two pivoting-yoke wheels respectively mounted at one of the ends of two symmetrical arms the other ends of which are connected by a common pin, which is adjustable in height, to a cylindrical bearing member mounted freely at the end of one or other of the hubs of the rear wheels of a motor vehicle, more especially an agricultural tractor of any desired type, said cylindrical bearing member being arranged in such manner as to receive a pivoting device for automatically engaging and handling the loads.

The device has a front arm elastically connected to the cylindrical bearing member in such manner that it can first be lowered at the commencement of raising the load, while the said cylindrical bearing member pivots and inclines in the forward direction, and then progressively returns to its initial position, at the same time as the cylindrical bearing member, as the lifting operation progresses.

A rear arm of the device is joined to the cylindrical bearing member by means of a rigid adjustable connection and serves to some extent as a stay to support the loaded engagement and handling device, as soon as it has cleared the vertical position and drops towards the tractor in order to discharge or empty its load.

The cylindrical bearing member carries a drive unit and/or the various movements of the engagement and handling device hereinbefore specified, and comprises a pivoting beam having two articulated arms forming a clamp, the opening of which is effected by means of an appropriate linkage and closurse of which is effected automatically by means of a spring which is tensioned on the rising of the beam, the said spring being freed by means of a device which is released as soon as it is brought to bear against the load to be engaged.

The aforesaid driving unit comprises a single-acting jack which can be connected to an auxiliary hydraulic take-off, with which tractors are customarily provided, or to an independent source of pressure. Said jack is coupled to the pivoting beam by means of a set of levers and articulated rods, which on the one hand move the said beam into the position in which it frees the load and, on the other hand, in combination with one or more suitably disposed springs, return the same into a position for engagement with a new load, the return movement being braked by the delivery and lamination of the driving fluid in its supply pipe to the jack, the pressure having been interrupted by the driver immediately after the freeing of the load.

In a modification of the above-described device, when the beam operated, as in the previous case, by means of a hydraulic jack, has cleared the vertical position to assume the position in which it frees its load, its movement is braked by one or more springs which, immediately it is free of the said load, return it to the position for engagement with a new load, braking being effected, as from the vertical position, by the lamination of the driving fluid in its supply pipe.

In order that the invention may be more readily understood, two embodiments taken as examples and illustrated in the accompanying drawings will now be described by way of illustration and without any limiting force.

In these drawings:

FIGURE 1 is an elevation of one embodiment mounted on the left-hand rear wheel of an agricultural tractor;

FIGURE 2 is a partial view on a larger scale than FIGURE 1, showing a perspective view of a driving unit of the device illustrated in FIGURE 1;

FIGURE 3 is a section on the line III—III in FIGURE 1;

FIGURE 4 is a plan view from above of an engagement device;

FIGURE 5 is a section on the line V—V in FIGURE 4;

FIGURE 8 is a plan view of the engaging device with its arms enclosing a load;

FIGURE 9 is a section on the line IX—IX in FIGURE 8;

FIGURE 10 shows the device at the beginning of raising the load, immediately after the driver has put the jack into operation;

FIGURE 11 shows the relative position of the constituent elements of the device at the moment when the engaging beam clears the vertical position;

FIGURE 13 is a view on a larger scale showing the lower part of the beam and the mechanism for the release of the engaging elements, in the position they occupy in FIGURE 12;

FIGURE 14 is a perspective view of a second embodiment of the driving unit of the engaging beam, and FIGURES 15, 16, and 17 are diagrammatic views illustrating the operation of the device illustrated in FIGURE 14.

Figures 6, 7:
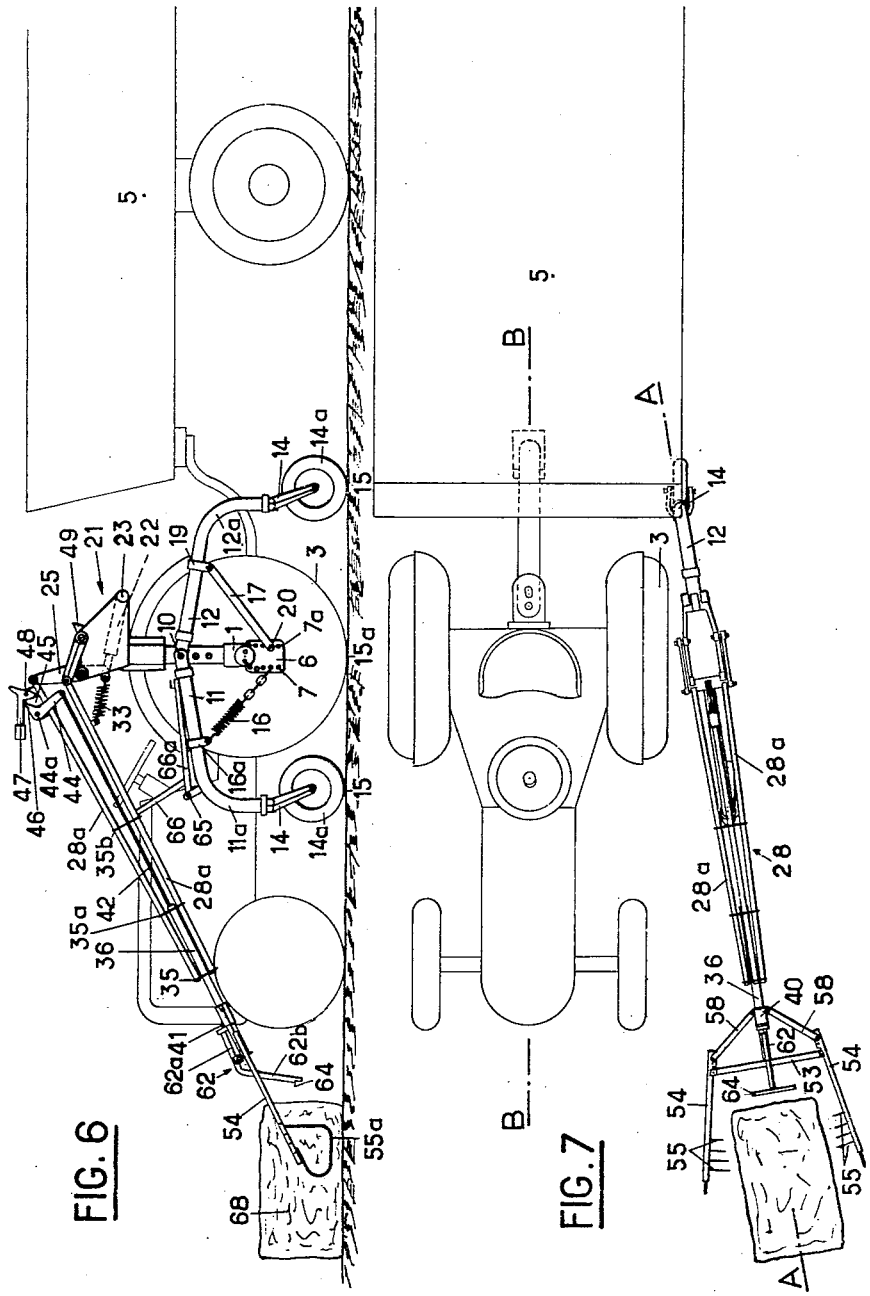
FIGURE 6 is an elevation showing the device in FIGURE 1 with its beam in the bale engagement position.
FIGURE 7 is a plan view of FIGURE 6.
Figure 12:
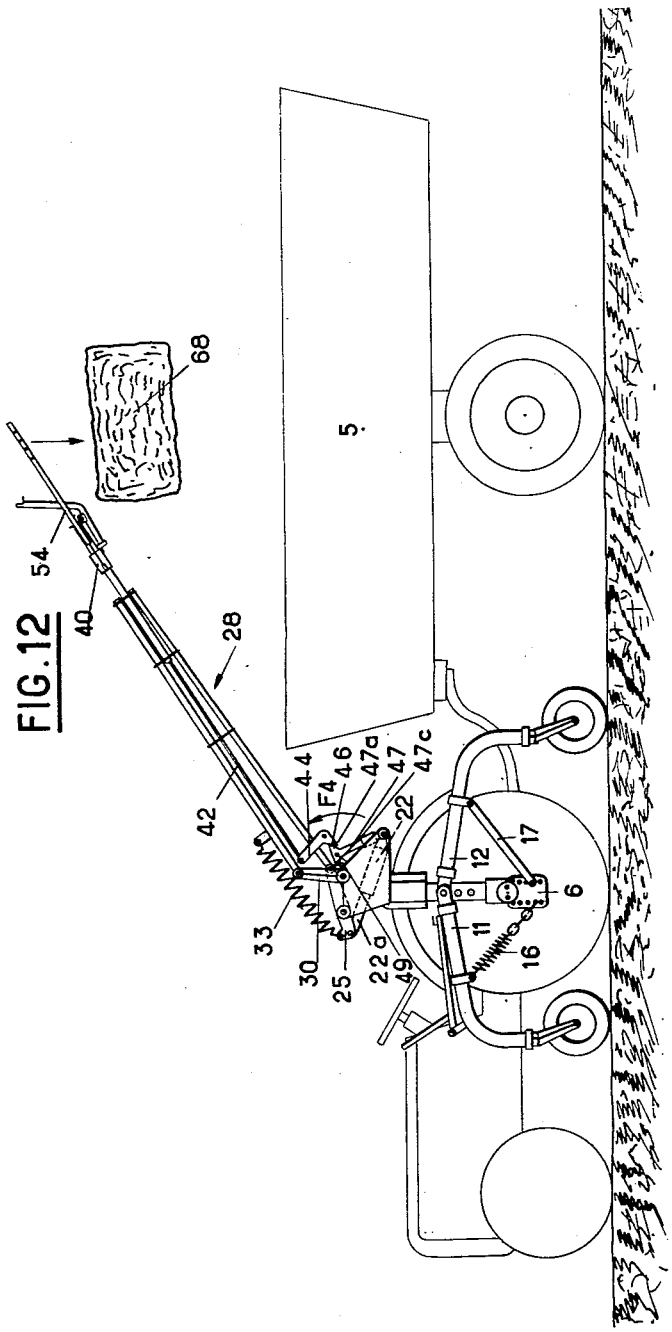
FIGURE 12 illustrates the liberation of the load by the engaging device.

With reference to the drawings, it will be seen that the embodiment of the device illustrated in FIGURES 1 to 13 inclusive comprises a bearing sleeve 1 mounted freely, with or without the interposition of appropriate bearings, on a shaft 2 (FIGURE 3) joined fast to the hub of the left-hand rear wheel 3 of a tractor 4 to which a trailer 5 of conventional type is coupled (FIGURES 6 and 7).

At its lower part, the bearing sleeve 1 is provided with a lug 6 formed with two rows of apertures 7—7a and at its upper part it has a cylindrical member 8 with a series of apertures 9 intended to receive a pin 10 on which are articulated two arms 11—12 bent at 11a—12a. The free ends of these bent parts receive the pivot axes 13 of two yokes 14 each provided with a wheel 14a, the point of support of which on the ground 15 corresponds normally to 15a, viz., that of the wheel 3.

According to one feature of the invention, the arm 11 is connected through a spring 16 to the aforesaid lug 6, the point of fastening of the ends of said spring being adjustable at will by means of the said apertures 7 and by means of a sliding collar 16a which can be locked after adjustment on the arm 11.

The arm 12 is connected to the lug 6 by means of a rigid spacer 17 fixed on the one hand at 18 on an adjustable sliding bow shaped member 19 and on the other hand on the lug 6 by means of a pin 20 engaged in one of said apertures 7a.

At the upper part of the cylindrical member 8 a rotary support 21 is rigidly fastened and on it is fixed a driving unit intended to operate a pivoting beam carrying the load-engaging device which will be described in detail hereinafter.

Said driving unit comprises a single-action jack 22 articulated at 23 on the support 21, a rod 22a of said jack being articulated at 24 on one end of a lever 25 pivoted at 26 on the support 21.

The other end of the lever 25 carries a pin 27 on which the end of a beam denoted by reference 28 in its entirety which supports the aforesaid engaging device, is pivoted. Said beam, the constituent elements 28a of which are connected by gussets 35—35a, 35b, is also articulated at 29 on a double connecting-rod which is in turn pivoted at 31 on the support 21.

At the end 25a of the lever 25 there is fixed at 32 one of the ends of a spring 33, the other end of which is fixed at 34a to a member 34 secured to the aforesaid constituent elements 28a.

At the free end of the elements 28a there is centered on the gussets 35, 35a a tube 36 which has two diametrically opposite longitudinal apertures 37, inside which tube a block 38 can slide, through which passes a pin 39 engaged in the apertures 37. The pin 39 is secured to an external sleeve 40 mounted slidably on the tube 36, said sleeve having a stop 41 shown in FIGURES 4 and 5.

On the block 38 is fixed one end of a rod 42, the other end of which is articulated at 43 on a lever 44 mounted to pivot at 44a at the end of a lug 45 joined fast to one of the elements 28a of the beam 28. The lever 44 has a nose 46 co-operating with a nose 47a of a rocking lever 47 mounted to pivot at 48 on the lug 45. The lever 47 has a mass 47b at its free end and on the side opposite the aforesaid nose 47a it has a second nose 47c co-operating with a supporting member 49 mounted to pivot on the pin 31 of the connecting rod 30, said supporting member being adjustable by means of an eccentric cam 50.

A spring 52 is mounted on the rod 42 between a stop 36a joined fast to the tube 36 and the sliding block 38.

At the free end of the tube 36 is fixed a cross-member 53, at the ends of which there are articulated on pins 53a arms 54 provided with teeth or dogs 55 at their front end, their rear end being formed with holes 56 in which there are articulated on pins 57 two connecting-rods 58 which are also articulated at 59 on the sliding sleeve 40. Each arm 54 is provided with a runner 55a which guides it on the ground.

On the cross-member 53 there is fixed by means of yokes 36b a member 60 which bears a pin 61 on which a bent lever 62 can pivot, the end of the upper arm 62a of said bent lever carrying a small plate 63 co-operating with the stop 41 of the sliding sleeve 40, while its front arm 62b is provided with a transverse stop 64 of appropriate length. When it comes into contact with a load 68 (FIGURE 9) said stop is intended to free the tensioned spring 52 and effect automatic closure of the arms 54 of the engaging device, as will be explained hereinafter.

At the lower end of the member 60 a cylinder 69 is fixed in which a piston with a spring 69a co-operating by its end with a stop member 69b fixed on the lever 62 can operate, said stop member exerting a thrust in the direction of the arrow F on the arm 62a and normally keeping it applied against the tube 36 (FIGURES 1, 5 and 9).

On the arm 11a there is mounted pivotally at 65 a support comprising two arms of inequal length, 66 and 66a, which are directed substantially at 90° in relation to one another. At their free ends said arms have hooks 67—67a disposed in such manner that the gusset 35b engages either in the hook 67a when the beam 28 is in the travelling position and rests on the arm 66 of the support (FIGURE 1), or in the hook 67 when the said beam in the operating position rests on the raised arm 66, the arm 68a then being folded over against the arm 11a of the wheel train (FIGURE 6).

With reference to FIGURE 7, it should be noted that the longitudinal axis A—A of the beam 28 is not parallel to the axis B—B of the tractor, the object of this being to enable the engaging element to be in the correct position for freeing the load 68, above the trailer 5, when the beam 28 has reached the end of its rearwardly pivoting stroke.

The operation of the device defined hereinbefore will now be described and in order to facilitate the explanation reference will be made to FIGURES 4 to 13 inclusive:

It will be assumed that the beam 28 is in the working position, that is to say resting on the hook 67 of the arm 66 (FIGURE 6). The spring 52 is compressed between the block 38 and the stop 36a, the arm 63 bears on the stop 41 and the arms 54 of the engaging device are spaced apart. When the tractor is put into operation, the driver manoeuvres it in such manner that the arms 54 frame the load 68, for example a bale of straw (FIGURES 6 and 7). As the tractor continues to advance, the stop 64 meets the bale 68, and the resistance to the advance offered by the latter causes the lever 62 to pivot about the axis 61, the end 63 of the arm 62a of said lever thus freeing the stop 41 of the sliding sleeve 40 (FIGURE 9). The spring 52 resuming its inherent state immediately expands and pushes the block 38 which drives the pin 39 in the apertures 37 and causes the sleeve 40 to slide on the tube 36. This sliding of the sleeve 40 has the effect of simultaneously pivoting the engaging arms 54 on their pins 53a and effecting clamping of the bale 68 (FIGURES 4, 5, 8, 9). At the moment, the driver puts into operation the jack 22 which by means of its rod 22a acts on the lever 25 to raise the beam 28. This effects a lowering of the arm 11, braked and limited by the action of the spring 16, and this lowering movement continues as long as the weight of the load 68 and the force of the spring 16 are not in equilibrium. As soon as this equilibrium is established, the beam 28 rises in the direction of the arrow F1 (FIGURE 10) at the same time as the cylindrical member 8 which was inclined in the forward direction, that is to say in the direction of the load during the lowering of the arm 11, progressively resumes its vertical position and the arm 12 which was raised with its wheel again comes to rest on the ground. The jack continues to act on the lever 25, and the beam 28 rises into the vertical position (FIGURE 11) and tensions the spring 33. When the beam has passed the vertical position, the mass 47b causes the lever 47 to pivot in the direction of the arrow F2 about the axis 48, and its nose 47a attacks the nose 46 of the lever 44 to which the tensioning rod 42 is coupled.

As soon as the beam 28 has begun its downward movement towards the trailer 5, the nose 47c of the lever 47 encounters the supporting member 49 which is conveniently adjusted by means of its eccentric 50. Said supporting member causes the lever 47 to pivot progressively about its axis in the direction of the arrow F4, the nose 47a of said lever acting on the nose 46 effecting the pivoting of the lever 44 on its axis 44a. This pivoting movement of the lever 44 is manifested in the tractive force on the tensioning rod 42 which, by means of the block 38, effects the tensioning of the spring 52 and, through the medium of the sleeve 40 and the connecting rods 58, opens the engaging arms 54 and frees the load which is thrown on to the trailer 5. At the same time, the arm 62a of the lever 62 pushed by the piston 69a is re-engaged with the stop 41 (FIGURE 5).

At that moment, the driver interrupts the hydraulic pressure to the jack and immediately the force stored in the spring 33 outweighs the mass of the pivoting assembly, it returns said assembly into the working position (FIGURE 6), the lowering movement being braked by the delivery and lamination of the driving fluid which is no longer under pressure in the supply pipe.

The device is then immediately ready to carry out a new lifting and loading operation in the same conditions as previously.

In the embodiment illustrated in FIGURE 14, it will be seen that the end of the cylindrical member 8 of the device has a support fixed thereon, the said support comprising two symmetrical plates 70—71 between which there is pivoted on a pin 72 a single-action jack 22, the rod 22a of which is articulated at 73 on a lever 74 mounted to pivot at 75 on the plates 70—71 and provided at its free end with a roller 76 on which the beam 28 rests through the medium of a plate 77.

Two springs 78—79 are fixed by one of their ends on the plates 70—71, the other ends of said springs being connected by rods 80—81 to two symmetrical connecting rods 82—83 articulated at 84 on the plates 70—71, the pin 84 being the pivot point for the beam 28.

On the free ends of the connecting rods 82 and 83 there are mounted to pivot at 85 two sectors 86—87 having a series of apertures 88 co-operating with arresting means 89—90.

The sector 86 has on its inner face a stud 91 cooperating with an incline 92 formed on the rear end of the beam 28.

The sector 87 has on its inner surface a stud 93 cooperating with the arm 94 of a bent lever articulated at 95, the second arm 96 of said lever being coupled to one end of a rod 97, the other end of which is articulated at 98 on a lever 99 having adjustment apertures.

The lever 99 pivots on a pin 100 on which another connecting rod 101 is keyed, the said connecting rod 101 being coupled to the free end of the tensioning rod 42.

The operation of this device is as follows: the engaging means 54 having engaged a load 58 as shown in FIGURES 1 to 13, and the jack 22 having been put into operation, the engaging beam 28 pivots about its axis 84 (FIGURE 15) and when it has passed the vertical position (FIGURE 16) the incline 92 comes into contact with the stud 91. At that moment, the hydraulic pressure ceases to be applied to the jack, the latter being in contact. The beam 28 continuing its lowering movement towards the point where the load is freed, the spring 78 is progressively tensioned by the pull of the rod 80 and of the lever 82. The beam provided with its load continues its travel, the latter being braked by the spring 78 until the stud 93 connected to the spring 79 by the rod 81 and the lever 83 bears on one of the ends of the arm of said bent lever causing the latter to pivot about its axis 95 which, during its movement, drives the connecting rod 97 connected to the lever 101 joined fast to the tensioning rod 42, thus opening the engaging arms. The load being immediately freed, the force of the spring 78 becomes preponderant and progressively returns the empty beam in the forward direction. Once the vertical position has again been cleared, the plate 77 of the beam resumes contact with the roller 76 and the hydraulic pressure having ceased—owing to the return to zero of the distributor controlled by the tractor driver—the downward braking is effected by the delivery and lamination of the driving fluid in its supply pipe in the manner explained hereinbefore.

It is understood that the embodiments hereinbefore described have been given solely by way of example and may have any desired modifications without thereby departing from the scope of the invention.

What I claim is:

1. A device for lifting and handling loads adapted to be attached to a vehicle such as an agricultural tractor, said device being characterized by the fact that it comprises a suspension and running gear including an elongated generally vertical supporting member (1, 6, 8) adapted to be pivotally mounted on said tractor near its rear axle, symmetrical front and back arms (11, 12), means (10) pivotally connecting said arms to said supporting member for swinging movement about an axis parallel to said rear axle, said connecting means being vertically adjustable on said supporting member, a wheel (14a) pivotally mounted on the free end of each arm, a load lifting boom (28) rotatably attached to said supporting member above said pivotal connecting means for swinging movement about an axis parallel to the axis of said arms, and additional means (16, 17) connecting said arms to said supporting member at points vertically spaced from said pivotal connecting means.

2. A device as claimed in claim 1 in which said supporting member carries a hydraulic jack adapted to be connected to the hydraulic system of said tractor, said jack being pivotally connected at one end to said supporting member and at the other to lever means pivotally connected to said boom, said jack serving to swing said boom between a forwardly extending position in which the free end of said boom is near the ground and a rearwardly extending position in which said boom is at a predetermined angle relative to said support.

3. A device as claimed in claim 2 in which the additional means (16) connecting the front arm (11) to the supporting member (6—1—8) comprises a spring adjustably biassing said front arm toward said supporting member, said spring yielding to permit said supporting member to swing forward when said jack begins to swing said boom from its forwardly extending to its rearwardly extending position, and the additional means (17) connecting said rear arm (12) to said supporting member (6—1—8) is a rigid bar which cooperates with said rear arm to maintain said support in a vertical position when said boom reaches its rearward position.

4. A device as claimed in claim 1, in which said supporting member comprises a bearing adapted to be carried on the hub of a rear wheel of said tractor.

5. A device according to claim 1, characterized by the fact that the additional means connecting said front arm to the supporting member is elastic so that the upper end of the supporting member moves forward and downward at the beginning of the raising of the load while the said bearing member pivots and inclines in the forward direction, and then returns to its initial position, as the lifting operation progresses.

6. A device according to claim 1 characterized by the fact that the additional means connecting said rear arm to the supporting member is rigid and adjustable, said rear arm serving to support the loaded engaging and handling device, as soon as it has cleared the vertical position and is then lowered rearwardly in order to discharge or release its load.

References Cited in the file of this patent

UNITED STATES PATENTS

| 2,704,164 | David | Mar. 15, 1955 |
| 2,838,189 | Norbury | June 10, 1958 |
| 2,864,625 | Clements | Dec. 16, 1958 |